Aug. 17, 1965    J. N. COATS    3,201,156
PIPE COUPLING HAVING CLAMPING FORCE ADJUSTING MEANS
Filed Nov. 7, 1960
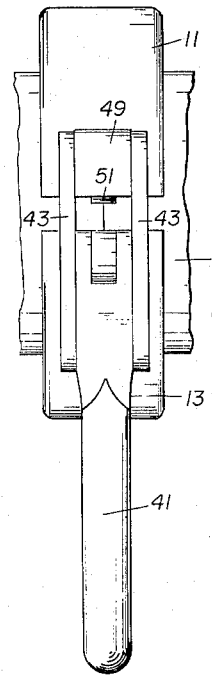
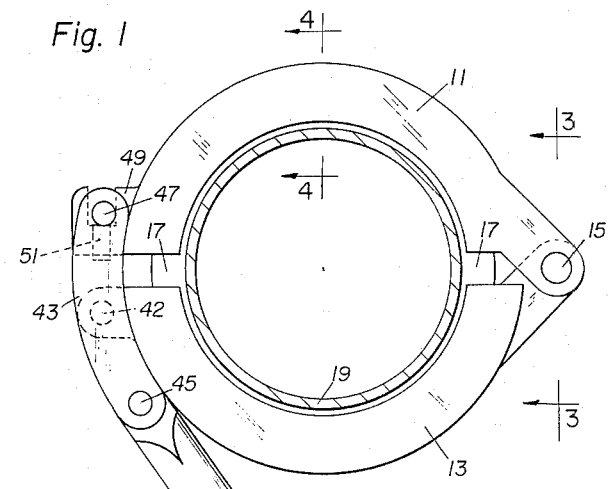
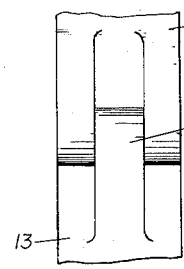
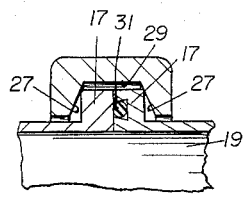
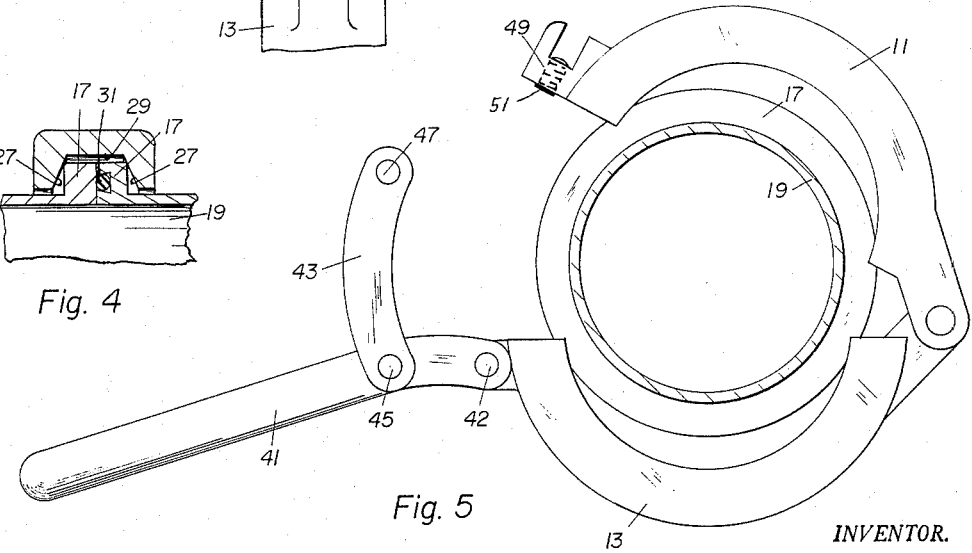
INVENTOR.
John N. Coats
BY
Buckhorn, Cheatham & Blore
ATTORNEYS

# United States Patent Office 3,201,156
Patented Aug. 17, 1965

3,201,156
PIPE COUPLING HAVING CLAMPING
FORCE ADJUSTING MEANS
John N. Coats, 1935 W. Washington Way,
Longview, Wash.
Filed Nov. 7, 1960, Ser. No. 67,541
1 Claim. (Cl. 285—365)

This invention relates to a coupler for pipe flanges and particularly to a quick disconnect coupler.

In my prior application entitled Pipe Interconnection Assembly, Serial No. 9,977 and filed Feb. 19, 1960, and now abandoned, there is disclosed a pipe assembly wherein a first pipe must be disconnected from a second pipe and then connected to a third pipe. It is desirable to be able to do this quickly, yet forming a good seal between the pipes.

It is a main object of the present invention to provide a quick disconnect coupler which is operable to clamp a pair of pipe flanges together to form a seal therebetween, while holding the flanges aligned with one another.

A more specific object is to provide such a coupler that can be opened or closed by the operation of a handle, and which automatically locks itself in its closed position.

A further object is to provide a coupler of the type described above that can be readily adjusted to regulate the clamping force applied to the pipe flanges.

Various other objects of the invention will be apparent from the following description taken in connection with the accompanying drawings wherein:

FIG. 1 is a side view of a coupler of my invention in clamping position on a pair of pipe flanges, one pipe being shown in section;

FIG. 2 is an edge view of the coupler, taken of the near edge;

FIG. 3 is an edge view of part of the coupler taken of the far edge in the direction of the arrows 3—3 of FIG. 1;

FIG. 4 is a fragmentary section taken along line 4—4 of FIG. 1; and

FIG. 5 is a view similar to FIG. 1 but showing the coupler in a partially open condition.

The coupler comprises two main members 11 and 13 of semicircular form pivotally connected together at one set of ends by a knuckle connection 15 (FIGS. 1 and 3) to permit the members to be opened (FIG. 5) for positioning about the flanges 17 of pipes 19, and then closed to contact such flanges (FIG. 1). Each member has a groove on its concave surface (FIG. 4), said groove being defined by a pair of spaced camming surfaces 27 and a bottom surface 29. The camming surfaces diverge from the bottom surface 29 as is clear from FIG. 4. On O-ring 31 is provided in one of the flanges 17 and projects slightly from its groove when not compressed.

The members 11 and 13 are so dimensioned relative to the diameter of the flanges 17 and to the combined thicknesses of the flange 17 and the projecting portion of O-ring 31, that when the members are placed about flanges, the camming surfaces will engage the corners of the flanges remote from the O-ring 31. Thus when the members 11 and 13 are forced inwardly, the camming surfaces 27 will slide against the mentioned flange corners and impart axial forces against the flanges forcing the flanges together to form a tight seal therebetween by virtue of the O-ring 31.

The means for forcing the members inwardly include a handle 41 pivoted at 42 (FIG. 5) on the free end of the member 13. A double arm link 43 is pivotally connected at 45 to the handle in spaced relation to the pivot 43 at a place so that in the open position of the handle a pin 47 on the opposite end of the link is disposed in position to engage a hook 49 on the free end of the member 11. The double arms of the link 43 straddle the inboard end of the handle 41 and also the hook 49 (FIG. 2).

The parts are so dimensioned that the pin 47 may readily fit within the hook 49 when the handle is in its raised or open position, and will act to pull the free ends of the members 11 and 13 toward one another when the handle is swung downwardly or to its closed position (FIG. 1).

The handle is curved at its inboard end so as to closely nest against the members 11 and 13 in the closed position of the handle. Also, the curvature of the handle permits it to have a greater arc of swing, in fact sufficient that when the handle rests against the members 11 and 13, the pivot 45 is in an over-center position relative to the pivot 42, in relation to the pin 47 (FIG. 1). This locks the handle in its closed position.

The hook 49 is provided with an adjustable element in the form of a set screw 51 (FIG. 1) threaded through a hole in the hook so that the pin 47 engages an end of the screw. By adjusting the position of the screw, the closed positions of the members 11 and 13 relative to the flanges 17 can be varied to vary the axial clamping force on the flanges.

Having described the invention in what is considered to be the preferred embodiment thereof, it is desired that it be understood that the invention is not to be limited other than by the provisions of the following claim.

I claim:

In combination, a pair of aligned pipes having opposed flanges, sealing means between said flanges, and means for imposing a clamping force on said flanges forcing them toward one another comprising a pair of members having generally semicircular grooves to fit over and around said flanges, said grooves being defined at least in part by diverging side walls providing camming portions engaging said flanges and operable to exert an axial force on said flanges in response to inwardly radial movement of said members, and means for causing such inward radial movement of said members, the last-named means comprising means pivotally connecting one set of ends of said members and means for drawing the other set of ends of said members toward one another, the last named means comprising a hook on the free end of one member, a handle pivoted on the free end of the other member, a link pivoted at one end on said handle intermediate the length of the handle, and having its other end equipped with a pin received by said hook, and a pin-engaging member in the inner extremity of said hook and adjustable toward and away from said pin to vary the clamping pressure applied by said members to said flanges.

References Cited by the Examiner

UNITED STATES PATENTS

| | | | |
|---|---|---|---|
| 144,997 | 11/73 | Mayall | 24—270 |
| 815,558 | 3/06 | Rosier | 24—270 |
| 1,007,326 | 10/11 | Boyd | 285—365 |
| 1,162,362 | 11/15 | Hyland | 24—270 |
| 1,518,479 | 12/24 | Brewer | 285—409 |
| 1,646,463 | 10/27 | Stokesberry | 285—409 |
| 2,219,161 | 10/40 | Jacobs | 285—365 |
| 2,673,102 | 3/54 | Hutchinson | 285—409 |
| 2,869,211 | 1/59 | Kessler | 24—270 |
| 3,042,430 | 7/62 | Guy | 285—365 |

FOREIGN PATENTS

| | | |
|---|---|---|
| 569,547 | 1/59 | Canada. |

CARL W. TOMLIN, *Primary Examiner.*